United States Patent [19]

Toyama

[11] Patent Number: 5,432,547
[45] Date of Patent: Jul. 11, 1995

[54] DEVICE FOR MONITORING DISREGARD OF A TRAFFIC SIGNAL

[75] Inventor: Masakazu Toyama, Tokyo, Japan

[73] Assignee: Matsushita Electric Industrial Co., Ltd., Osaka, Japan

[21] Appl. No.: 977,023

[22] Filed: Nov. 16, 1992

[30] Foreign Application Priority Data

Nov. 22, 1991 [JP] Japan .................. 3-332834

[51] Int. Cl.⁶ .......................................... H04N 7/18
[52] U.S. Cl. ................................. 348/149; 340/937
[58] Field of Search .................. 358/93, 108; 340/933, 340/936, 937, 928, 942, 291; H04N 7/18; 348/148, 149, 155

[56] References Cited

U.S. PATENT DOCUMENTS

| | | | |
|---|---|---|---|
| 3,690,233 | 9/1972 | Billinasley | 340/937 |
| 4,117,404 | 9/1978 | Marshall | 340/32 |
| 4,173,010 | 10/1979 | Hoffmann | 340/316 |
| 4,884,072 | 11/1989 | Horsch | 340/937 |
| 4,887,080 | 12/1989 | Gross | 340/937 |
| 4,908,704 | 3/1990 | Fujioka et al. | 358/108 |
| 5,041,828 | 8/1991 | Loeven | 340/937 |
| 5,066,950 | 11/1991 | Schweitzer et al. | 340/937 |
| 5,083,200 | 1/1992 | Deffontaines | 358/108 |

Primary Examiner—Tommy P. Chin
Assistant Examiner—Richard Lee
Attorney, Agent, or Firm—Stevens, Davis, Miller & Mosher

[57] ABSTRACT

A device for cracking down on disregard of a traffic signal includes a television camera for imaging a road, on which signal lights are mounted at a cross; a vehicle movement measuring instrument for processing image data coming from the television camera and measures traveling position and traveling speed of each vehicle; a signal state detector for detecting an indication color of the signal lights; and a traffic signal disregarding vehicle detector for detecting a vehicle which has disregarded a traffic signal, based on the traveling position and the traveling speed of the vehicle measured by the vehicle movement measuring instrument and the indication color of the signal lights detected by the signal state detector. The vehicle movement measuring instrument measures the distance from the cross and the speed of the vehicle. In the case where there is a vehicle traveling within the cross, while the signal state detector detects a red indication of the signal lights, it is detected as a vehicle which has disregarded the traffic signal, and a recorder records the traveling state and the registration number thereof.

9 Claims, 9 Drawing Sheets

DEVICE FOR MONITORING DISREGARD OF A TRAFFIC SIGNAL

BACKGROUND OF THE INVENTION

The present invention relates to a device for cracking down on disregard of a traffic signal, which detects automatically vehicles disregarding a traffic signal to crack down thereon.

Heretofore crackdown on vehicles disregarding a traffic signal is effected by a policeman remaining on standby at a cross for the purpose of cracking down thereon or when a vehicle, which has disregarded a traffic signal, has been accidentally found by a patrol car, etc. during a patrol.

However, since such a prior art cracking down method involves direct crackdown by a policeman, it has a problem that it is difficult to effect the crackdown continuously over 24 hours.

SUMMARY OF THE INVENTION

The present invention is directed to solving such a problem of the prior art technique in the crackdown on disregard of a traffic signal and the object thereof is to provide a device for cracking down on disregard of a traffic signal capable of continously supervising disregard of traffic signal over 24 hours to crack down thereon.

A device for cracking down on disregard of a traffic signal according to the present invention comprises a television camera for imaging a road, on which signal lights are mounted; vehicle movement measuring means, which processes image data coming from the television camera and measures traveling position and traveling speed of each vehicle; signal state detecting means for detecting a signal state of the signal lights; and traffic signal disregarding vehicle detecting means for detecting a vehicle which has disregarded a traffic signal, based on the traveling position and the traveling speed of the vehicle measured by the vehicle movement measuring means and the signal state of the signal lights detected by the signal state detecting means.

Further there are disposed traveling state recording means, which records a traveling state of the vehicle violating a traffic regulation, when the traffic signal disregarding vehicle detecting means detects a vehicle which has disregarded the traffic signal, and/or registration number recording means, which detects and records the registration number on a number plate of the vehicle violating the traffic regulation.

There is disposed further transmission means, which transmits an alert to a police box, a police station or a patrol car, when the traffic signal disregarding vehicle detecting means detects a vehicle which has disregarded the traffic signal.

There is disposed also signal indication change instructing means, which transmits an instruction to change the indication of the next signal light located in the traveling direction of the vehicle violating the traffic regulation into red, when the traffic signal disregarding vehicle detecting means detects a vehicle which has disregarded the traffic signal.

The detection of the signal state of the signal lights by the signal state detecting means is effected by inputting a lightening control signal from a traffic signal controller, which controls lightening of the signal lights or by processing images of the signal lights imaged by the television camera.

In this way, by the device for cracking down on disregard of a traffic signal according to the present invention, the vehicle movement measuring means measures the distance from the vehicle to the signal lights or the cross and the traveling speed through processing of image data obtained by the television camera and if there is a vehicle, for which it is judged, based on the traveling position and the traveling speed of the vehicle, that the vehicle is traveling in, disregard of the traffic signal, while the signal state detecting means detects a red indication in the signal lights, the traffic signal disregarding vehicle detecting means detects it.

When the vehicle violating the traffic regulation is detected, the traveling state and the registration number of the vehicle are recorded and a police box, a police station or a patrol car are informed thereof, or the indication of the next signal lights is changed into red in order to stop forcedly the vehicle violating the traffic regulation.

DESCRIPTION OF THE PREFERRED EMBODIMENTS

Figure 1:
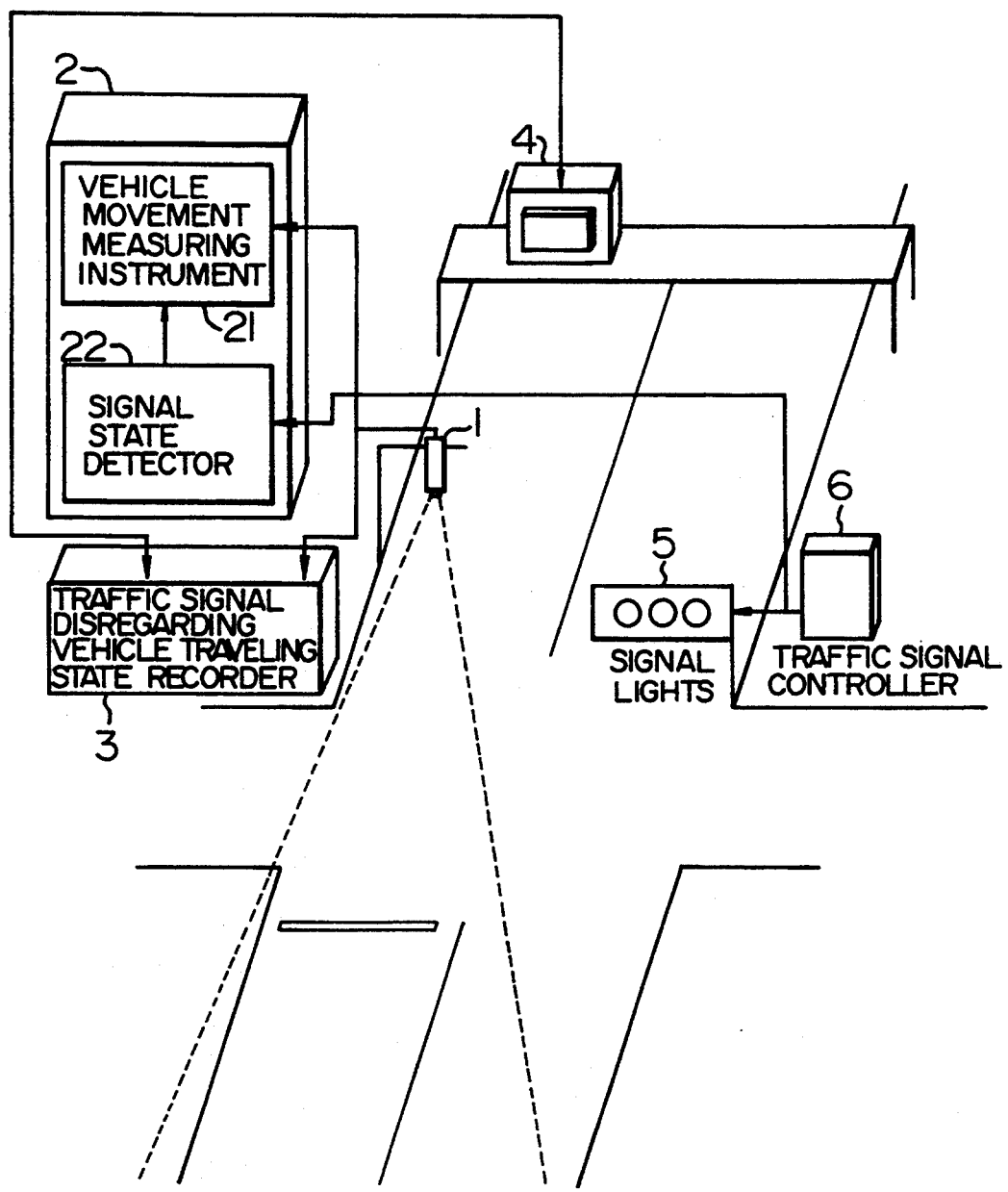
FIG. 1 is a block diagram of a first embodiment of the device for cracking down on disregard of a traffic signal according to the present invention.

The device for cracking down on disregard of a traffic signal according to the first embodiment comprises, as indicated in FIG. 1, a television camera 1 mounted at a high position on a road side so that a road including a cross can be imaged; a traffic signal disregarding vehicle measuring instrument 2 detecting a vehicle which has disregarded a traffic signal; a traffic signal disregarding vehicle traveling state recorder 3 for recording traveling state of the vehicle which has disregarded a traffic signal; and a registration number detector 4, which images the front of the vehicle and detects the registration number from image data thus obtained.

The traffic signal disregarding vehicle measuring instrument 2 includes a vehicle movement measuring instrument 21, which measures the distance of the vehicle from the cross (traveling position) and the traveling speed, based on the image data from the television camera 1, and records the history of the traveling state of the vehicle, and a signal state detector 22 detecting the signal state of signal lights 5, which light is actually lightened, by inputting a lightening control signal, which controls lightening and extinction of the signal lights 5, from a traffic signal controller 6.

Now the operation of the device for cracking down on disregard of a traffic signal according to the first embodiment of the present invention will be explained.

At first, the television camera 1 images the situation of the road including the neighborhood of the cross. Image data obtained by this imaging are sent to the vehicle movement measuring instrument 21 in the traffic signal disregarding vehicle measuring instrument 2. The vehicle movement measuring instrument 21 processes the image data in real time to measure the distance between the cross and each of the vehicles traveling towards the cross and the traveling speed thereof.

The traffic signal controller 6 outputs a lightening control signal to the signal lights 5 on the basis of internal data or data from a central device. This lightening control signal for the signal lights 5 is inputted also to the signal state detector 22 in the traffic signal disregarding vehicle measuring instrument 2. The signal state detector 22 detects the present signal state, starting from this lightening control signal for the signal lights 5, and sends information on the signal state to the vehicle movement measuring instrument 21.

The vehicle movement measuring instrument 21 links the information on the signal state for the signal lights 5 with the distance from the cross and the traveling speed measured independently for the different vehicles and records them as history of the different vehicles. The traffic signal disregarding vehicle measuring instrument 2 judges on the basis of the information on the signal state of the signal lights 5, the distance from the cross and the traveling speed whether the relevant traveling vehicle has disregarded the traffic signal.

In the case where it has judged that the vehicle has disregarded the traffic signal, the traffic signal disregarding vehicle measuring instrument 2 sends signals to the traffic signal disregarding vehicle traveling state recorder 3 and the registration number detector 4. The traffic signal disregarding vehicle traveling state recorder 3 records the image data from the television camera 1 imaging the traveling state of the vehicle which has disregarded the traffic signal, and at the same time the registration number detector 4 images the front of the vehicle which has disregarded the traffic signal, and processes the image data thus obtained to detect and store the registration number.

Figure 2:
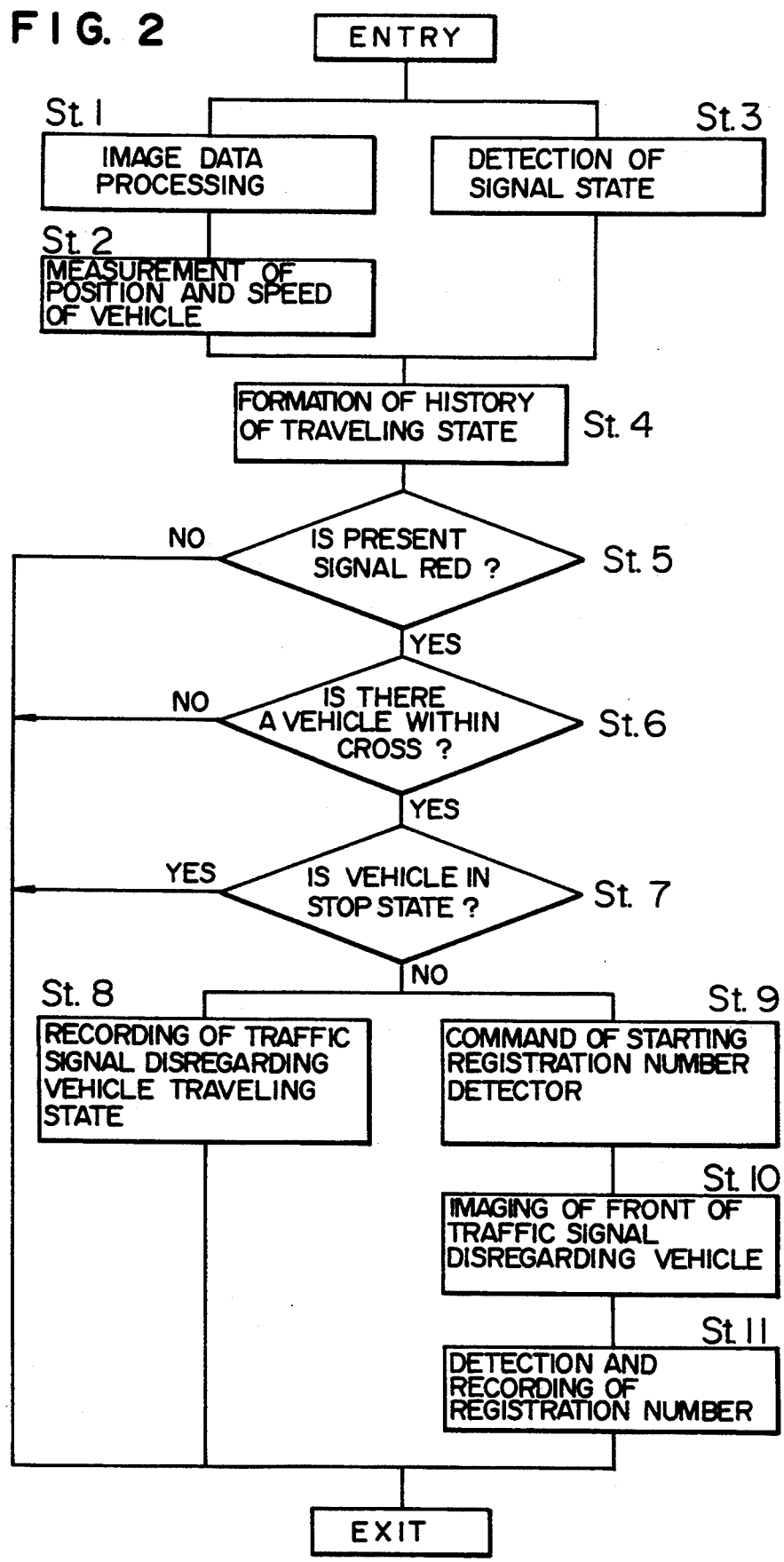
FIG. 2 is a flow chart indicating the procedure of detecting and recording vehicles disregarding the traffic signal in the first embodiment.

The traffic signal disregarding vehicle measuring instrument 2 detects the vehicle which has disregarded the traffic signal, and the procedure to command the recording of the vehicle is effected according to the flow chart indicated in FIG. 2.

In STEP 1, the vehicle movement measuring instrument 21 in the traffic signal disregarding vehicle measuring instrument 2 extracts only the traveling vehicle from the image data coming from the television camera 1 by subtracting background data therefrom.

In STEP 2, the data on the distance of the vehicle from the cross are obtained from these extracted data.

Further, these are compared with data before a predetermined period of time, and data on the traveling speed are obtained from the relation between the traveled distance and the time therebetween.

At the same time, in STEP 3, the signal state detector 22 in the traffic signal disregarding vehicle measuring instrument 2 detects the present indication color of the signal lights 5 at the cross on the basis of the lightening control signal from the traffic signal controller 6.

In STEP 4, the vehicle movement measuring instrument 21 puts information obtained in STEP 2 and STEP 3 together to form the history of the traveling state independently for the different vehicles.

In STEP 5, in the signal state detector 22, it is judged whether the indication color of the signal lights 5 detected at that time is red or not.

In STEP 6, when the indication color is red, it is judged whether there is a vehicle, whose data on the distance from the cross in the history thereof indicate that it is within the cross, or not.

In STEP 7, when there exists a pertinent vehicle, it is judged whether data on the traveling speed in the history of the vehicle indicate that the vehicle is stopped there, or not.

In STEP 8, when the pertinent vehicle shows no stop state, it is judged that the vehicle is one which has disregarded the traffic signal and an instruction is given to the traffic signal disregarding vehicle traveling state recorder 3 to record image data obtained by the television camera 1.

At the same time, in STEP 9, a measurement instruction is given to the registration number detector 4.

In STEP 10, in the registration number detector 4, which has received the instruction, the front of the vehicle which has disregarded the traffic signal is imaged.

In STEP 11, the registration number is detected by processing the obtained image data and recorded.

As described above, by the device for cracking down on disregard of a traffic signal according to the first embodiment, by tracing each of the traveling vehicles in the vehicle movement measuring instrument 21 and by grasping the signal indication of the signal lights 5 when the relevant vehicle has passed through the cross, it is possible to effect the detection over 24 hours whether the vehicle has disregarded the traffic signal. Further, when a vehicle which has disregarded the traffic signal has been found, the traveling state and the registration number of the relevant vehicle are recorded by the traffic signal disregarding vehicle traveling state recorder 3 and the registration number detector 4, respectively, and can be used as proving material of the violation.

Figure 3:
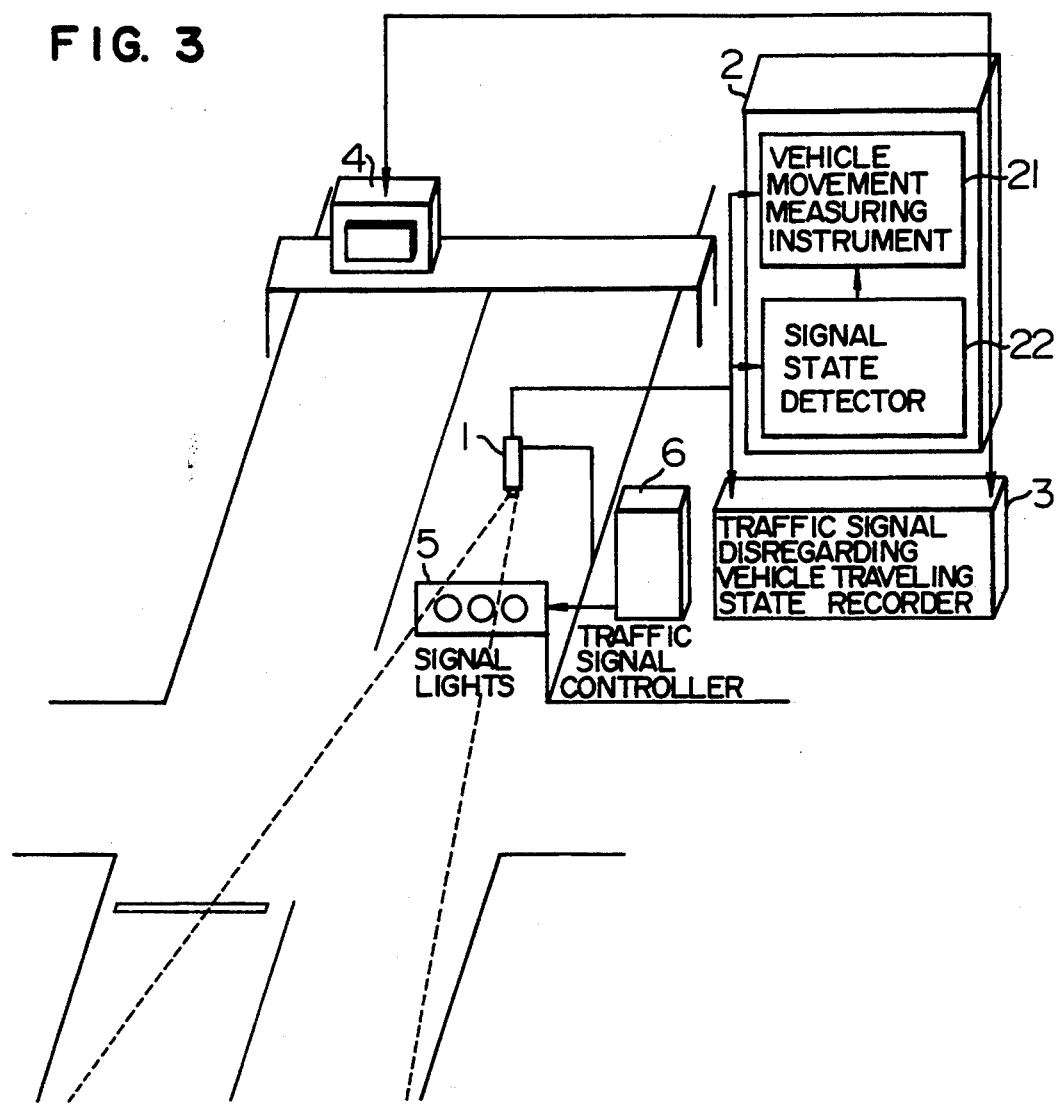
FIG. 3 is a block diagram of a second embodiment of the device for cracking down on disregard of a traffic signal according to the present invention.

In the device for cracking down on disregard of a traffic signal according to the second embodiment, as indicated in FIG. 3, the television camera 1 is mounted at a high position on a road side so that the road including the cross and the signal lights at the cross can be imaged. Further the traffic signal disregarding vehicle measuring instrument 2, for detecting vehicles which have disregarded the traffic signal, includes the vehicle movement measuring instrument 21 and the signal state detector 22 detecting the present signal state of the signal lights 5. This signal state detector 22 detects the present signal state of the signal lights 5 by processing the image of the signal light part imaged in a part of the image of the television camera 1. The construction of the other parts is the same as in the device in the first embodiment.

Now the operation of the device for cracking down on disregard of a traffic signal according to the second embodiment will be explained.

Figure 4:
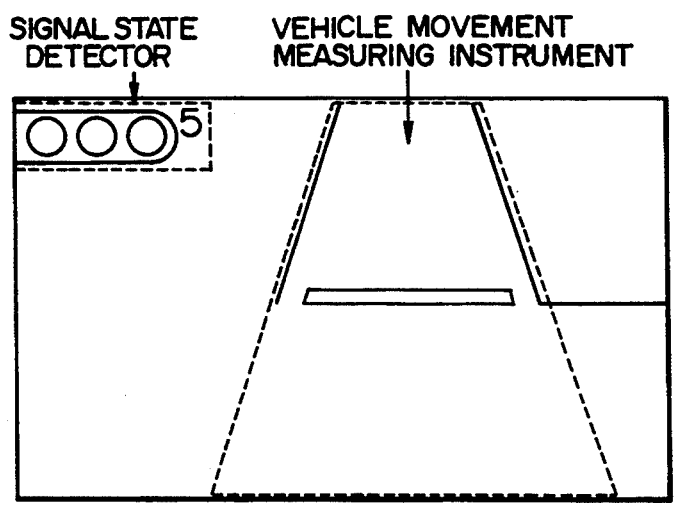
FIG. 4 is a diagram indicating image data in the second embodiment.

At first, the television camera 1 takes, as indicated in FIG. 4, image data representing situation of the road including the neighborhood of the cross and the signal lights 5 at the cross.

These image data are sent to the vehicle movement measuring instrument 21 and the signal state detector 22 in the traffic signal disregarding vehicle measuring instrument 2. The vehicle movement measuring instrument 21 processes a part of the image data representing the traveling state of the vehicle in real time and measures the distance from the cross and the traveling speed of each of vehicles traveling towards the cross. On the other hand, the signal state detector 22 detects the present signal state from the part of the image data, in which the signal lights 5 are imaged, and sends information on the signal state thus detected to the vehicle movement measuring instrument 21.

The vehicle movement measuring instrument 21 links the information on the signal state with the distance from the cross and the traveling speed measured independently for the different vehicles and records them as the history of the different vehicles. The traffic signal disregarding vehicle measuring instrument 2 judges on the basis of the information on the signal state, the distance from the cross (traveling position) and the traveling speed whether the relevant traveling vehicle has disregarded the traffic signal.

In the case where it is judged that the vehicle has disregarded the traffic signal, the traffic signal disregarding vehicle traveling state recorder 3 and the registration number detector 4 are made to effect operations similar to those described in the first embodiment.

Further, in the traffic signal disregarding vehicle measuring instrument 2, the vehicle, which has disregarded the traffic signal is detected and the procedure to command recording of the vehicle is identical to that indicated in FIG. 2.

In the device for cracking down on disregard of a traffic signal according to the second embodiment, it is not necessary to lay any signal line between the traffic signal controller 6 and the traffic signal disregarding vehicle measuring instrument 2 and thus it is possible to reduce installation work.

Figure 5:
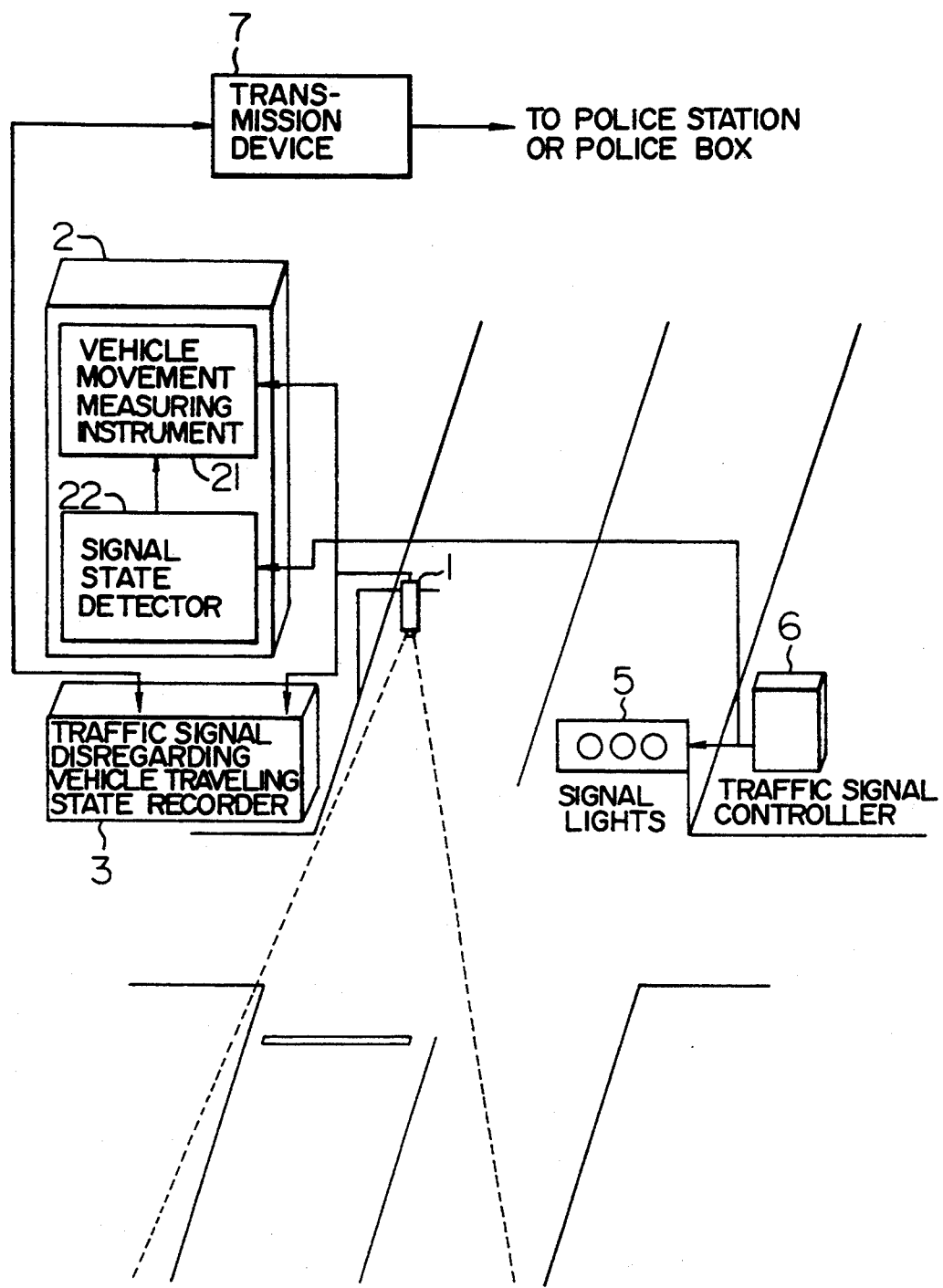
FIG. 5 is a block diagram of a third embodiment of the device for cracking down on disregard of a traffic signal according to the present invention.

The device for cracking down on disregard of a traffic signal according to the third embodiment is provided with a transmission device 7 communicating with a police box, a police station or a patrol car, as indicated in FIG. 5, and it is constructed so as to give an alert to the nearest police box, police station, patrol car, etc., when a vehicle, which has disregarded the traffic signal, is found.

The traffic signal disregarding vehicle measuring instrument 2 detects a vehicle which has disregarded the traffic signal by the same method as the instrument described in the first embodiment. When it detects the vehicle which has disregarded the traffic signal, an instruction is sent to the traffic signal disregarding vehicle traveling state recorder 3 and the transmission device 7. The traffic signal disregarding vehicle traveling state recorder 3 records the image of the television camera 1 imaging the traveling state of the vehicle, which has disregarded the traffic signal, and an alert is transmitted from the transmission device 7 to a police box, a police station or a patrol car.

Figure 6:
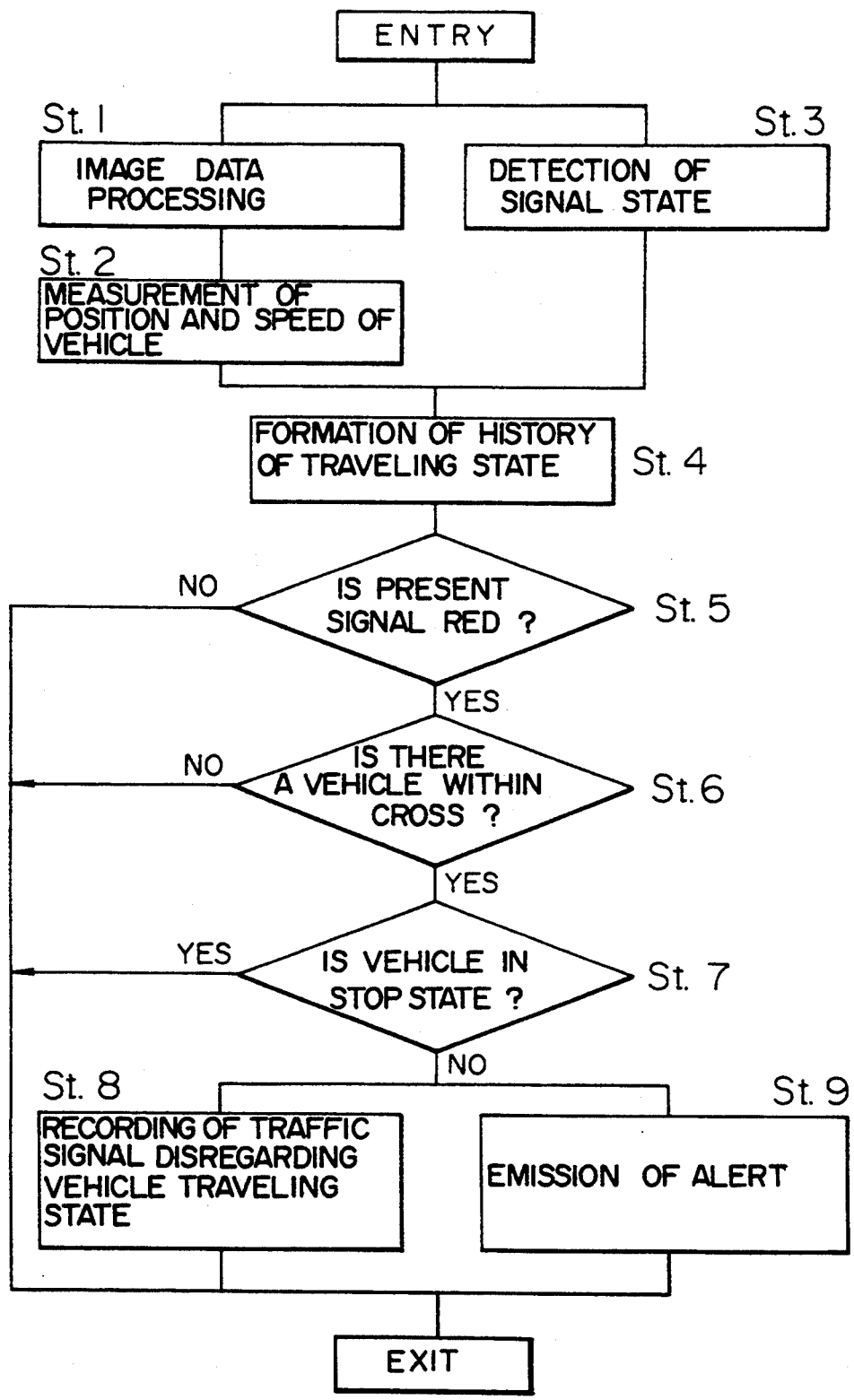
FIG. 6 is a flow chart indicating the procedure of detecting vehicles disregarding the traffic signal and giving an alert instruction in the third embodiment.

At this time the procedure of the detection and the recording of the vehicle which has disregarded the traffic signal, as well as the command of the alert in the traffic signal disregarding vehicle measuring instrument 2 are identical to the operations indicated in FIG. 6.

Figure 7:
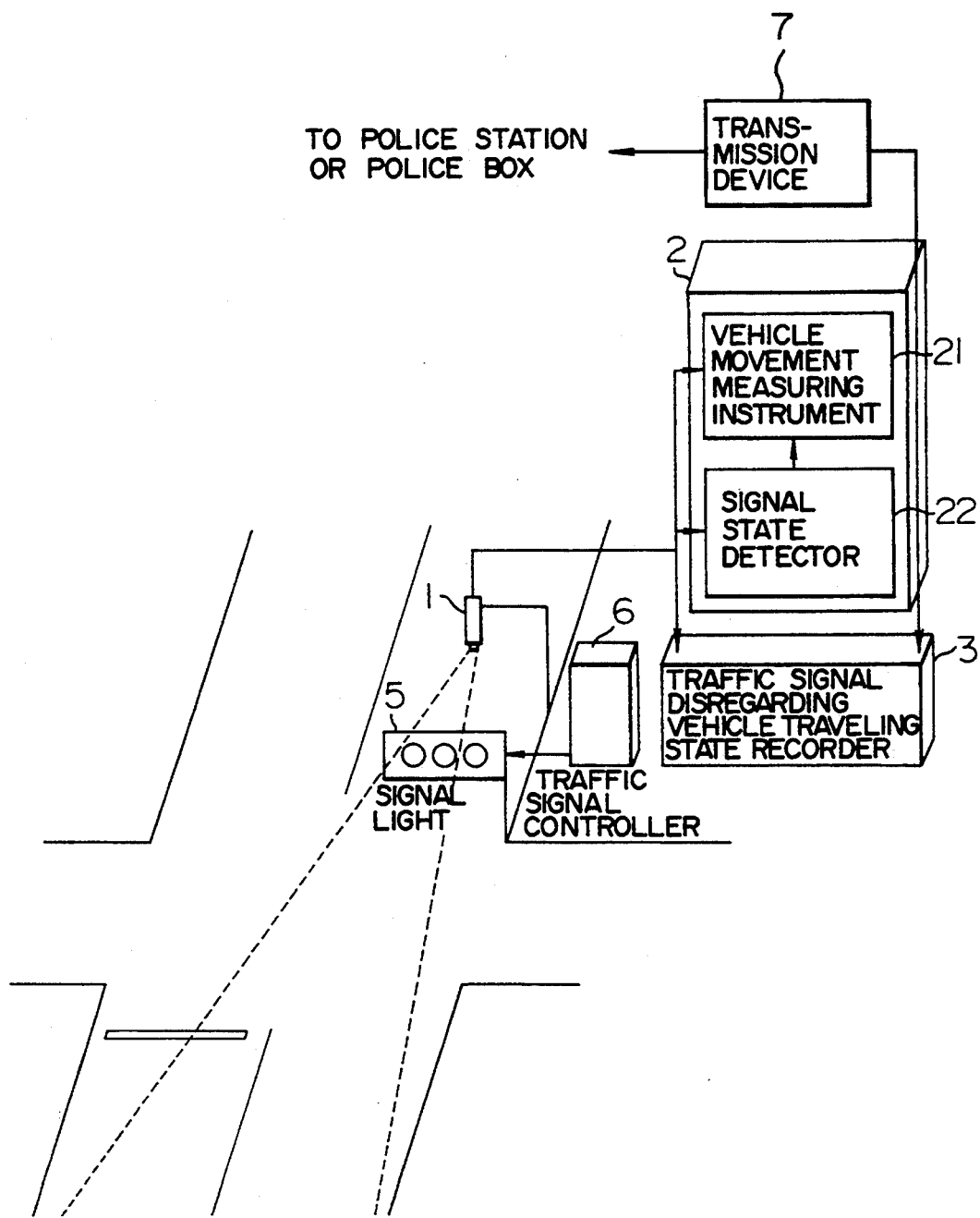
FIG. 7 is a block diagram of a fourth embodiment of the device for cracking down on disregard of a traffic signal according to the present invention.

The device for cracking down on disregard of a traffic signal according to the fourth embodiment is provided with a transmission device 7 communicating with a police box, a police station or a patrol car, as indicated in FIG. 7, similarly to the third embodiment, and it is constructed so as to give an alert to the nearest police box, police station, patrol car, etc., when a vehicle which has disregarded the traffic signal is found.

Differently from the third embodiment, the television camera 1 is mounted at a high position on a road side so that the road including the cross and the signal lights at the cross can be imaged simultaneously. The signal state detector 22, in the traffic signal disregarding vehicle measuring instrument 2 for detecting a vehicle which has disregarded the traffic signal, detects the present signal state of the signal lights 5 by processing the image of the signal light part imaged in a part of the image of the television camera 1 and the method therefor is identical to that explained in the second embodiment.

At this time the procedure of the detection and the recording of the vehicle which has disregarded the traffic signal, as well as the command of the alert in the traffic signal disregarding vehicle measuring instrument 2, are identical to the operations indicated in FIG. 6.

Figure 8:
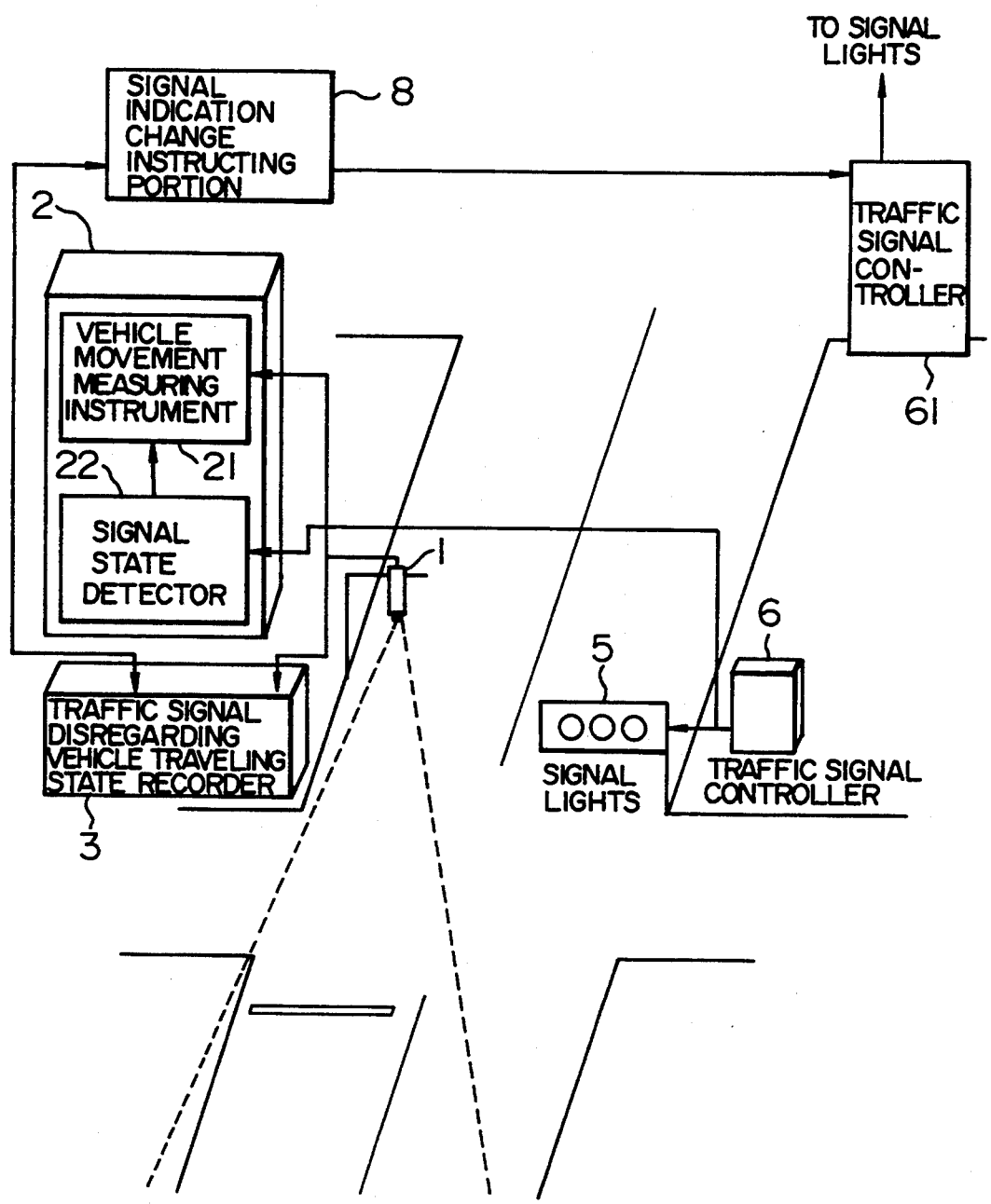
FIG. 8 is a block diagram of a fifth embodiment of the device for cracking down on disregard of a traffic signal according to the present invention.

The device for cracking down on disregard of a traffic signal according to the fifth embodiment is provided with a signal indication change instructing portion 8 connected with the traffic signal controller 61 at the next cross, as indicated in FIG. 8, and it is constructed so that an instruction is sent to the traffic signal controller 61 at the next cross in order to change the indication of the signal lights into red, when a vehicle which has disregarded the traffic signal is detected.

The traffic signal disregarding vehicle measuring instrument 2 detects a vehicle which has disregarded the traffic signal by the same method as the instrument described in the first embodiment. When it detects the vehicle which has disregarded the traffic signal, an instruction is sent to the traffic signal disregarding vehicle traveling state recorder 3 and the signal indication change instructing portion 8. The traffic signal disregarding vehicle traveling state recorder 3 records the image of the television camera 1 imaging the traveling state of the vehicle, which has disregarded the traffic signal.

Further the signal indication change instructing portion 8 calculates after how many seconds it will take the relevant vehicle to pass through the next cross, on the basis of information from the vehicle movement measuring instrument 21 and taking the calculated time into account, it sends an instruction to the control signal controller 61 at the next cross to change forcedly the indication of the signal into red to make the vehicle which has disregarded the traffic signal forcedly stop.

Figure 9:
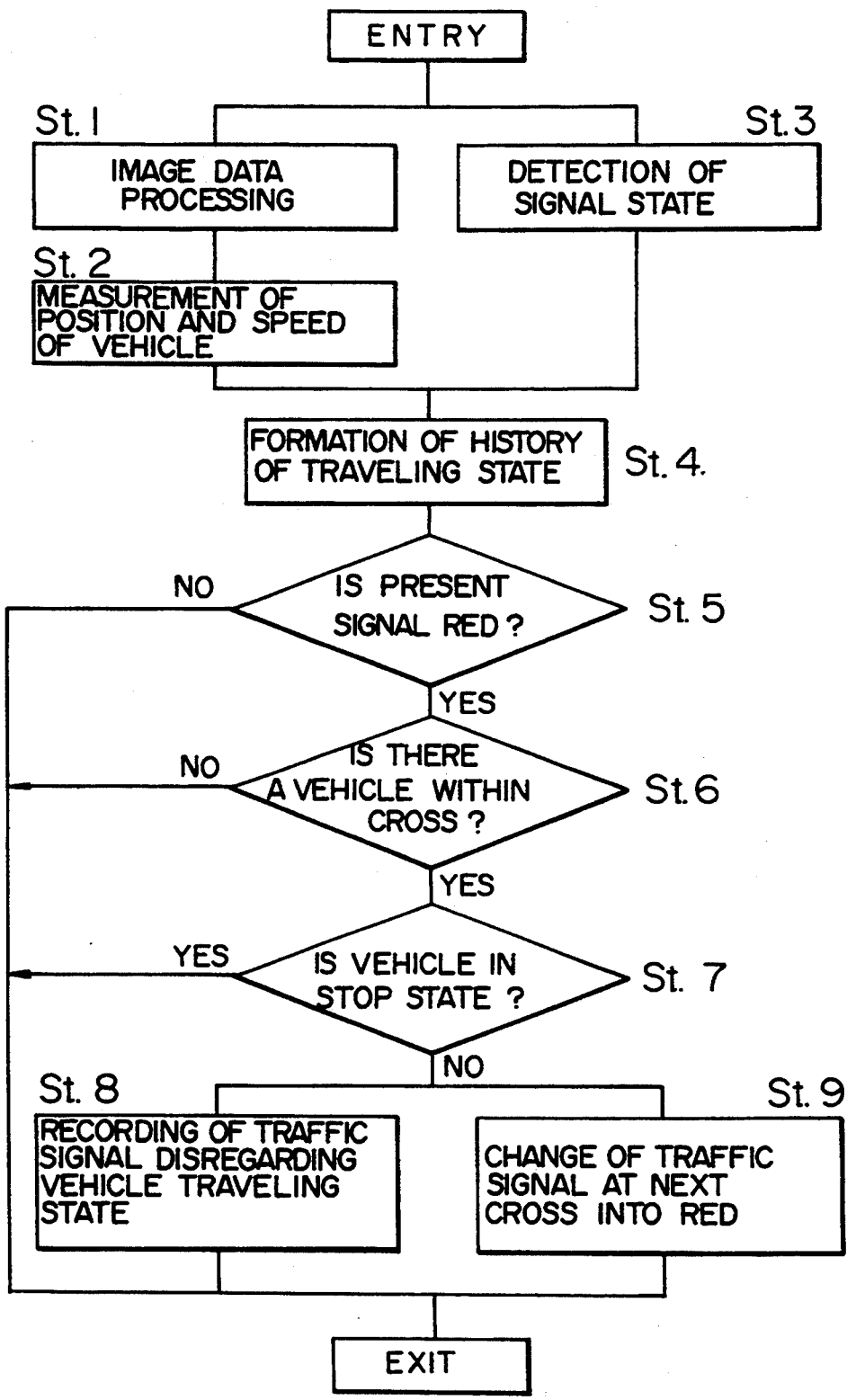
FIG. 9 is a flow chart indicating the procedure of detecting vehicles disregarding the traffic signal and changing the signal indication in the fifth embodiment.

At this time the procedure of the detection and the recording of the vehicle which has disregarded the traffic signal, as well as the command of the change in the signal indication are identical to the operations indicated in FIG. 9.

Figure 10:
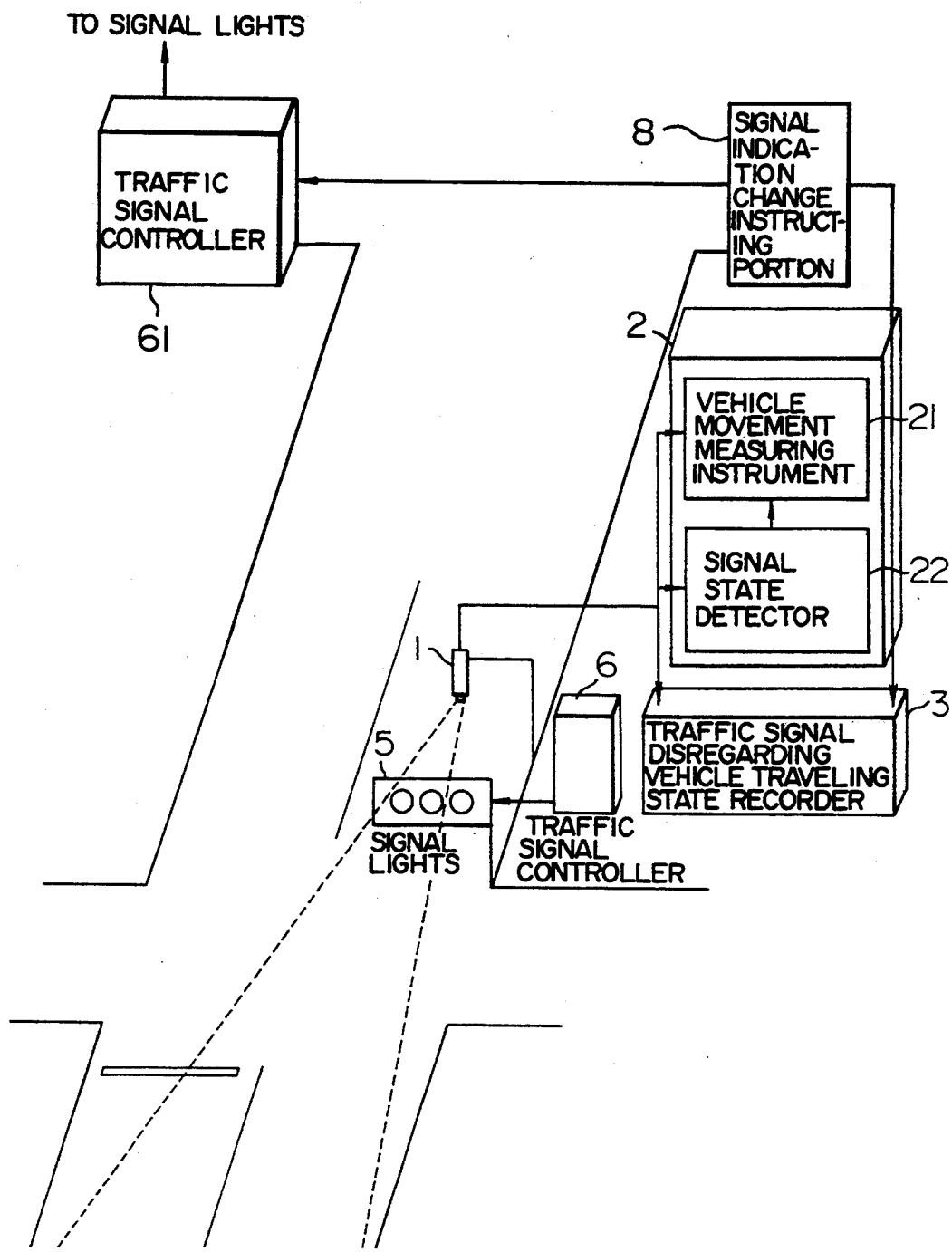
FIG. 10 is a block diagram of a sixth embodiment of the device for cracking down on disregard of a traffic signal according to the present invention.

The device for cracking down on disregard of a traffic signal according to the sixth embodiment is provided with a signal indication change instructing portion 8 connected with the control signal controller 61 at the next cross, as indicated in FIG. 10, similarly to the fifth embodiment, and it is constructed so that an instruction is sent to the control signal controller 61 at the next cross in order to change the indication of the signal lights into red, when a vehicle which has disregarded the traffic signal is detected.

Similarly to the device described in the second embodiment, the television camera 1 is mounted at a high position on a road side so that the road including the cross and the signal lights at the cross can be imaged simultaneously. Further the signal state detector 22, in the traffic signal disregarding vehicle measuring instrument 2 for detecting a vehicle which has disregarded the traffic signal, detects the present signal state of the signal lights 5 by processing the image of the signal light part imaged in a part of the image of the television camera 1. The construction of the other parts is identical to that described for the device in the fifth embodiment.

At this time the procedure of the detection and the recording of the vehicle which has disregarded the traffic signal, as well as the command of the change in the signal indication in the traffic signal disregarding vehicle measuring instrument 2 are identical to the operations indicated in FIG. 9.

Furthermore, suitably combining the constructions of the devices from the first embodiment to the sixth embodiment, it is possible to construct a device for cracking down on disregard of a traffic signal so that when a vehicle which has disregarded the traffic signal is found, some of the operation of recording the traveling state of the vehicle which has disregarded the traffic signal, the operation of recording the registration number, the operation of informing a police station, etc. thereof, and the operation of changing the indication of the signal lights at the next cross are effected simultaneously.

As clearly seen from the explanation of the above embodiments, by using the device for cracking down on disregard of a traffic signal according to the present invention, it is possible to detect automatically over 24 hours disregard of the traffic signal by a vehicle at a cross, to record the traveling state and the registration number of the vehicle as materials for proving violation of traffic regulations, or to inform a police station, etc. thereof, when a vehicle which has disregarded the traffic signal is found, or to change the indication of the signal lights at the next cross into red to make the vehicle which has disregarded the traffic signal stop forcedly there.

What is claimed is:

1. A device for monitoring disregard of a traffic signal comprising:
    a television camera for imaging a road above which signal lights are mounted;
    vehicle movement measuring means for processing image data provided by said television camera and for measuring traveling position and traveling speed of a vehicle based on processing of said image data;
    signal state detecting means for detecting a signal state of said signal lights;
    traffic signal disregarding vehicle detecting means for detecting whether said vehicle has disregarded a traffic signal, based on said traveling position and said traveling speed of said vehicle measured by said vehicle movement measuring means and said signal state of said signal lights detected by said signal state detecting means;
    traveling state recording means for recording a traveling state of said vehicle when said traffic signal disregarding vehicle detecting means detects that said vehicle has disregarded said traffic signal;
    registration number recording means for detecting and recording a registration number on a number plate of said vehicle when said traffic signal disregarding vehicle detecting means detects that said vehicle has disregarded said traffic signal;
    transmission means for transmitting an alert to a police box, a police station or a patrol car, when said traffic signal disregarding vehicle detecting means detects that said vehicle has disregarded said traffic signal; and
    signal indication change instruction means for transmitting an instruction to cause a next signal light located in a traveling direction of said vehicle to be red, when said traffic signal disregarding vehicle detecting means detects that said vehicle has disregarded said traffic signal.

2. A device for monitoring disregard of a traffic signal according to claim 1, wherein said signal state detecting means detects said signal state of said signal lights by inputting a lightening control signal from a traffic signal controller, which controls lightening of said signal lights.

3. A device for monitoring disregard of a traffic signal according to claim 1, wherein said signal state detecting means detects said signal state of said signal lights by processing image data relating to said signal lights provided by said television camera.

4. A device for monitoring disregard of a traffic signal comprising:
    a television camera for imaging a road above which signal lights are mounted;
    vehicle movement measuring means for processing image data provided by said television camera and for measuring traveling position and traveling speed of a vehicle based on processing of said image data;
    signal state detecting means for detecting a signal state of said signal lights;
    traffic signal disregarding vehicle detecting means for detecting whether said vehicle has disregarded a traffic signal, based on said traveling position and said traveling speed of said vehicle measured by said vehicle movement measuring means and said signal state of said signal lights detected by said signal state detecting means;
    traveling state recording means for recording a traveling state of said vehicle when said traffic signal disregarding vehicle detecting means detects that said vehicle has disregarded said traffic signal;
    transmission means for transmitting an alert to a police box, a police station or a patrol car, when said traffic signal disregarding vehicle detecting means detects that said vehicle has disregarded said traffic signal; and
    signal indication change instruction means for transmitting an instruction to cause a next signal light located in a traveling direction of said vehicle to be red, when said traffic signal disregarding vehicle detecting means detects that said vehicle has disregarded said traffic signal.

5. A device for monitoring disregard of a traffic signal according to claim 4, wherein said signal state detecting means detects said signal state of said signal lights by inputting a lightening control signal from a traffic signal controller, which controls lightening of said signal lights.

6. A device for monitoring disregard of a traffic signal according to claim 4, wherein said signal state detecting means detects said signal state of said signal lights by processing image data relating to said signal lights provided by said television camera.

7. A device for monitoring disregard of a traffic signal comprising:
   a television camera for imaging a road above which signal lights are mounted;
   vehicle movement measuring means for processing image data provided by said television camera and for measuring traveling position and traveling speed of a vehicle based on processing of said image data;
   signal state detecting means for detecting a signal state of said signal lights;
   traffic signal disregarding vehicle detecting means for detecting whether said vehicle has disregarded a traffic signal, based on said traveling position and said traveling speed of said vehicle measured by said vehicle movement measuring means and said signal state of said signal lights detected by said signal state detecting means;
   registration number recording means for detecting and recording a registration number on a number plate of said vehicle when said traffic signal disregarding vehicle detecting means detects that said vehicle has disregarded said traffic signal;
   transmission means for transmitting an alert to a police box, a police station or a patrol car, when said traffic signal disregarding vehicle detecting means detects that said vehicle has disregarded said traffic signal; and
   signal indication change instruction means for transmitting an instruction to cause a next signal light located in a traveling direction of said vehicle to be red, when said traffic signal disregarding vehicle detecting means detects that said vehicle has disregarded said traffic signal.

8. A device for monitoring disregard of a traffic signal according to claim 7, wherein said signal state detecting means detects said signal state of said signal lights by inputting a lightening control signal from a traffic signal controller, which controls lightening of said signal lights.

9. A device for monitoring disregard of a traffic signal according to claim 7, wherein said signal state detecting means detects said signal state of said signal lights by processing image data relating to said signal lights provided by said television camera.

* * * * *